United States Patent [19]
Wendt

[11] Patent Number: 5,314,324
[45] Date of Patent: May 24, 1994

[54] APPARATUS FOR FORMING A PARTIBLE PORT IN A PRODUCTION PIECE

[76] Inventor: Michael L. Wendt, 1382 E. Hull Rd., Hope, Mich. 48628

[21] Appl. No.: 954,887

[22] Filed: Sep. 29, 1992

Related U.S. Application Data

[63] Continuation-in-part of Ser. No. 621,226, Nov. 30, 1990, Pat. No. 5,151,233.

[51] Int. Cl.$^5$ .................. B29C 51/10; B29C 51/32
[52] U.S. Cl. .................... 425/299; 264/154;
264/504; 264/553; 425/304; 425/388;
425/405.1
[58] Field of Search .............. 425/387.1, 388, 394,
425/405.1, DIG. 60, 304, 298, 299; 264/153,
163, 154, 294, 553, 566, 571, 504, 547;
229/906.1, 103.1

[56] References Cited

U.S. PATENT DOCUMENTS

| | | | |
|---|---|---|---|
| 3,211,034 | 10/1965 | Andris | 83/685 |
| 3,381,068 | 4/1968 | Leiper et al. | 425/388 |
| 3,524,566 | 8/1970 | Parks | 229/906.1 |
| 3,735,653 | 5/1973 | Powell | 83/1 |
| 3,862,816 | 1/1975 | Granseus et al. | 425/292 |
| 3,945,528 | 3/1976 | Mowrey, Jr. | 220/265 |
| 4,009,981 | 3/1977 | Rosen | 425/388 |
| 4,057,382 | 11/1977 | Yamamori | 425/387.1 |
| 4,090,660 | 5/1978 | Schram et al. | 229/43 |
| 4,368,024 | 1/1983 | Asano | 425/388 |
| 4,377,084 | 3/1982 | Kaminski | 72/325 |
| 4,477,243 | 10/1984 | Wallstein | 425/388 |
| 4,518,096 | 5/1985 | Winstead | 220/268 |
| 4,636,349 | 1/1987 | MacLaughlin | 264/549 |
| 4,666,394 | 5/1987 | Wakamiya et al. | 425/387.1 |
| 4,877,151 | 10/1989 | Rush et al. | 425/388 |
| 4,877,391 | 10/1989 | Batson et al. | 425/291 |
| 4,878,826 | 11/1989 | Wendt | 425/387.1 |
| 5,025,947 | 6/1991 | Leone | 220/90.2 |
| 5,037,595 | 8/1991 | Kornelis | 264/153 |
| 5,073,329 | 12/1991 | Carrara | 264/163 |
| 5,151,233 | 9/1992 | Wendt | 264/153 |

*Primary Examiner*—Jay H. Woo
*Assistant Examiner*—Duane S. Smith
*Attorney, Agent, or Firm*—Timothy J. Martin

[57] ABSTRACT

The present invention generally relates to a device which can form a lid for a cup. This apparatus is for thermoforming a plastic sheet of material into a plurality of production sheets. Each sheet has a partible port section, which has integrity against passage of fluid, yet which is partible under mechanical pressure so as to open and allow the passage of fluids. The lid structure with a breakaway port is formed by an apparatus including an oven for heating the production piece, mold assembly that has a mold formed as a female cavity with a plurality of grooves formed around the cavity surface and a pressure box assembly that has an open position and a closed position. The breakaway port in the lid structure is formed as a female cavity with accordion-like grooves therearound which expand to engage the outside of the straw. This eliminates escape of the fluid through the breakaway port when the straw is inserted.

12 Claims, 8 Drawing Sheets

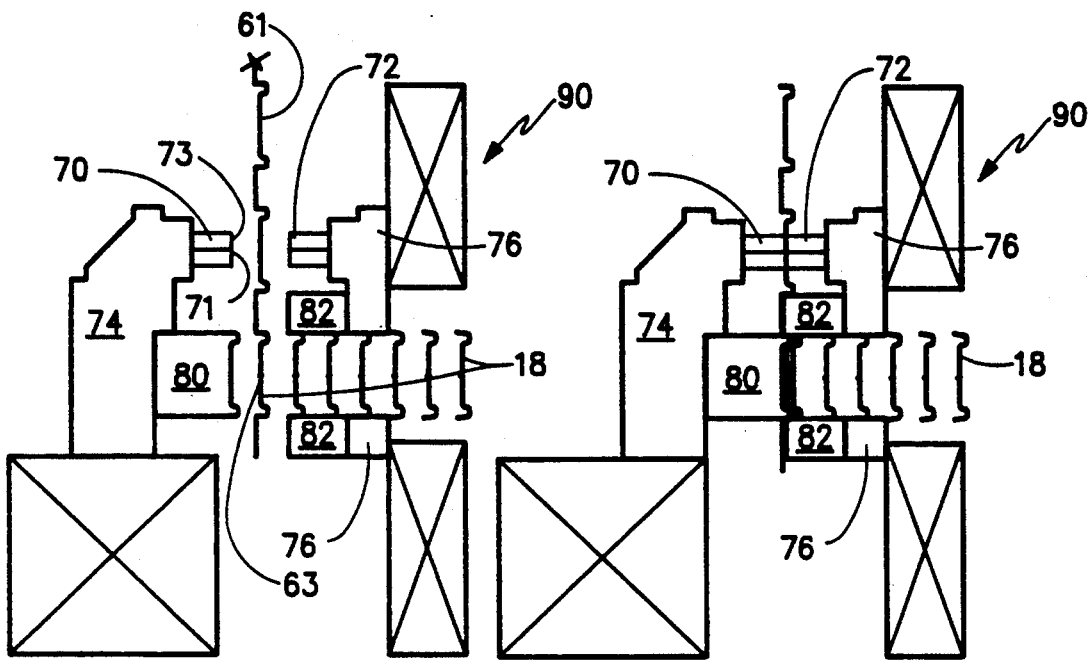
Fig.4a
(PRIOR ART)
Fig.4b
(PRIOR ART)
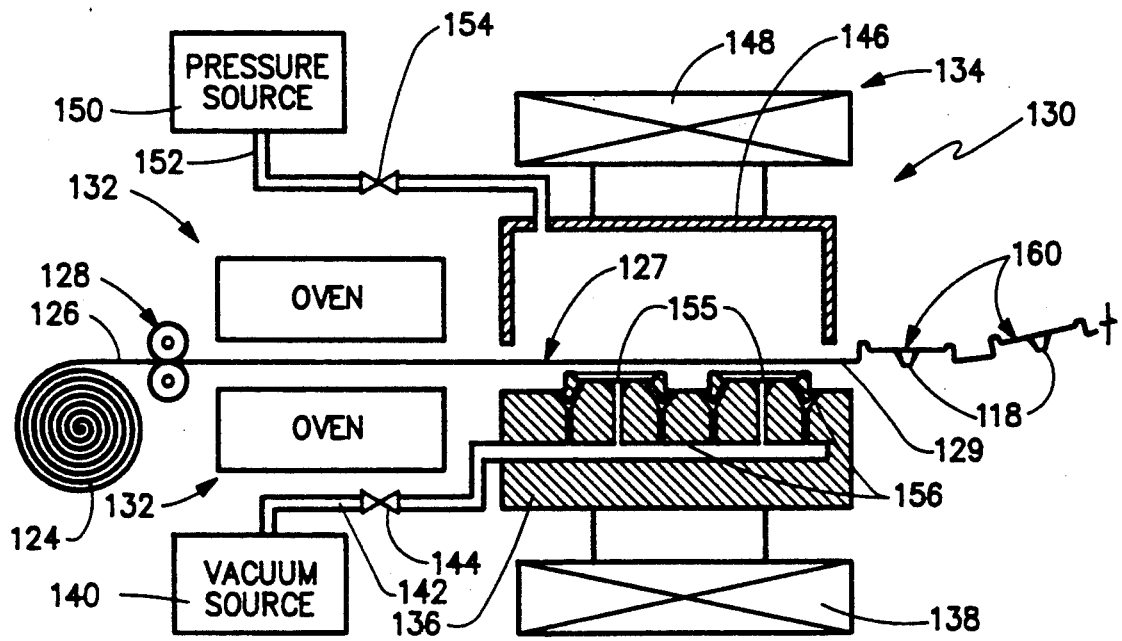
Fig.6a

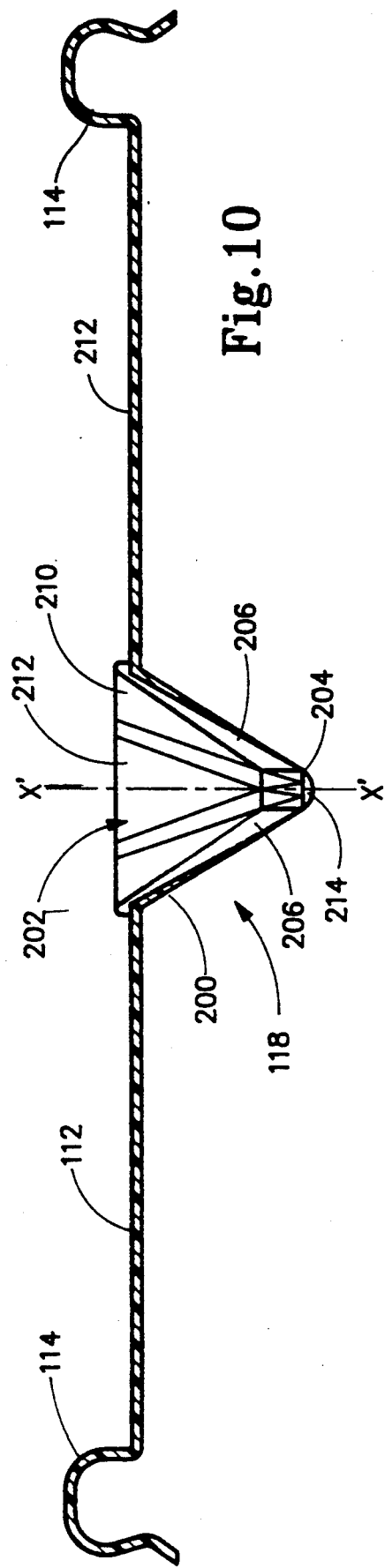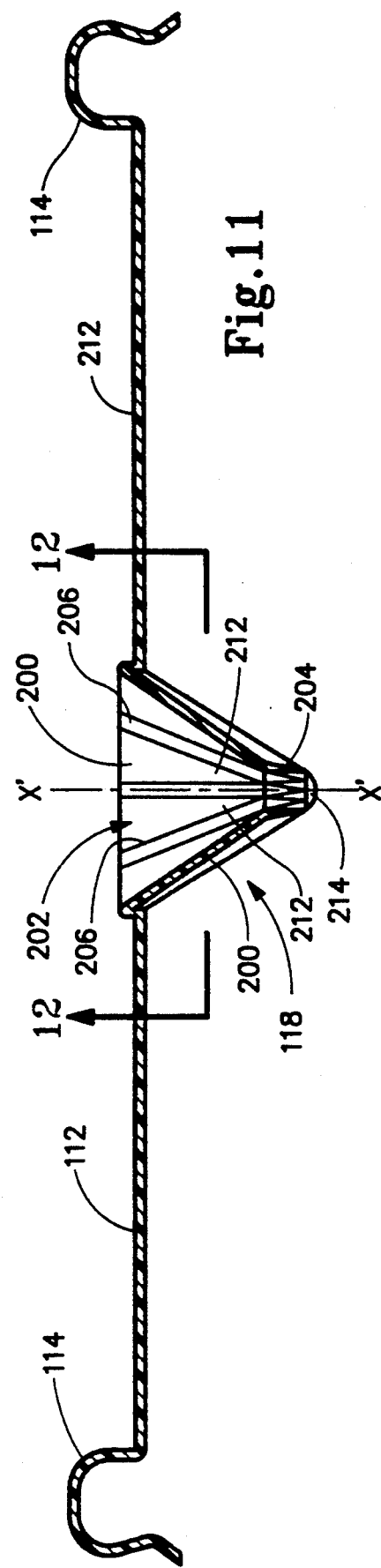

APPARATUS FOR FORMING A PARTIBLE PORT IN A PRODUCTION PIECE

The present invention is a continuation-in-part of my prior application identified as Ser. No. 07/621,226 filed Nov. 30, 1990, now U.S. Pat. No. 5,151,233 issued on Sep. 29, 1992.

FIELD OF THE INVENTION

The present invention relates generally to thermoforming materials in a plastic state. More particularly, the present invention concerns apparatus and methods for thermoforming a plastic sheet of material into a plurality of production pieces where each production piece has a partible port section which has integrity against the passage of fluids therethrough yet which is partible under mechanical pressure so as to open and thereby allow passage of fluids. The present invention also concerns thermoformed plastic beverage container lids to include a partible port section through which a straw may be advanced.

BACKGROUND OF THE INVENTION

The formation of production pieces out of moldable materials has historically been one of humankinds basic fabricating technologies. Traditionally, these molding techniques included shaping, casting and forging processes. In a shaping process, a moldable material is shaped or sculpted, usually by hand, into a desired configuration, and the material is then cured in some manner, such as heating or drying. In a casting process, a material to be molded is forced into a die so that it takes a selected shape, and the material is allowed to cure until the material becomes sufficiently set to retain the shape of the mold element. On the other hand, in the forging process, a malleable material is mechanically forced over the shape of a mold element so that it takes on and retains the profile thereof. It is essential in the forging process that the material be malleable or capable of being placed in a malleable or "plastic state." Certain materials used in this process are placed in a malleable or plastic state by heating so that the forging process is accomplished as a thermoforming operation. Strictly speaking, in the forging process, a material is heated and is hammered or beat into shape.

Since the advent of the "plastics age" during which various organic polymerized compounds have been utilized as a production medium, the distinctions between casting and forging have become blurred due to the versatility of the organic polymer medium. With the medium of plastic materials, three types of thermoforming processes are prevalent. One process, injection molding, may be likened to casting; injection molding is accomplished by forcing heated plastic material into a three dimensional mold element, and the production piece is released from the mold element when it has taken and can retain the shape of the mold. In another process, more akin to forging, a sheet of material that is heated to a plastic state is placed between male and female dies which close on the sheet to force a portion to take on the complementary profile of the male and female dies after which the dies open so that the formed production piece may be removed. Intermediate of these two techniques are the various pressure controlled thermoforming processes such as vacuum/pressure thermoforming and blow molding. In the vacuum/pressure process, a sheet of material to be fabricated is forced to take on the profile of either a male mold element or a female mold element by applying a vacuum (or suction) to one side of the sheet and/or pressure to the opposite side of the sheet so that the pressure differential on the plastisized sheet causes the sheet to conform to the shape of the mold element without the need for a complimentary die. In blow molding, a three dimensional object is formed or "cast" out of a three dimensional production blank in the form of a closed tube or other production piece having an interior. The production piece is heated to a plastic state, inserted into a mold and pressure is applied to the interior of the piece thereby causing it to expand against the sides of a mold. Vacuum or suction may also be applied exteriorly of the production piece to enhance the molding operation.

The present invention has applications generally to the thermoforming technology. In its most general form, the present invention may be employed to form a partible port section in a production piece that has a suitable panel portion available to receive a partible port. Most dominantly, the present invention is utilized concurrently during the initial fabrication of the production price rather than subsequently. The present invention has special application in the plastic lid industry wherein a container lid is fabricated out of a plastic material These lids are adapted to snap-fit onto the rim of a container, such as a paper or plastic cup or glass, in order to help prevent spillage of fluids placed in the container. To this end, the lid has a perimeter having a lip structure configured to engage the rim of the container.

Often, when lids are provided for a beverage container, it is desirable to provide a port section so that a drinking straw may be inserted through the port section thus allowing access to the liquid contents therein. In some instances, a tear-away port structure is provided on the lid adjacent the perimeter thereof to provide a drink access opening for the mouth of the user. Where straw ports are provided, and as discussed more thoroughly in the detailed description of the present disclosure, a port is provided by transverse cuts which extend completely through the lid panel so that a plurality of triangular shaped flaps are cut with these flaps having a common vertex location. When a straw is inserted through the port, then, the flaps bend interiorly of the container so that the effective port size increases. A disadvantage of this structure is present, however, since the cuts are made completely through the lid; this severing of the lid violates the integrity of the lid in its ability to prohibit passage of fluid. Therefore, even before a straw is inserted through the port, liquid may be spilled out of the port section. Likewise, once the straw is inserted through the port, liquid may escape out of the parted section around the straw's outer perimeter. Where tear-away port sections are provided, it has been found difficult to use these tear-away ports because, as a result of the fabrication techniques, it is difficult to control the thickness of the lid thereby resulting in inefficient tear-away lines. Furthermore, tear-away sections once torn, permit liquid in the cup to spill if the cup is tipped.

Due to the disadvantages of the prior art techniques, a significant need has existed for a substantial period of time to develop apparatus and methodology to create a partible port section that remains completely sealed until mechanical force is applied to part the port section from the container lid and to create a partible port section which forms a seal around the straw once the port is opened. There has been a need for such process having a high degree of control so that such port sections may be formed in high speed production operations with reliability. There has been a further need for apparatus capable of consistently creating such partible port sections in the panel of a thermoformed article. These needs were addressed in my U.S. Pat. No. 5,151,233. The present thermoform vacuum/pressure process and apparatus is also directed to meeting these needs as well as to the need for creating a better relative seal between the lid and straw after insertion of the straw through the port.

SUMMARY OF THE INVENTION

It is an object of the present invention to provide an apparatus and method for forming a partible port section in a production piece having a suitable panel in which such port section may be formed.

Another object of the present invention is to provide a new and useful thermoforming process for creating a breakaway port section, especially in a container lid used in the drink industry, and to provide a lid with an improved breakaway port section.

A further object of the present invention is to provide an apparatus and method for consistently forming a breakaway port section in a production piece wherein the port section maintains integrity against fluid transfer yet which may be readily partible under mechanical pressure to create an opening through which fluids may pass.

Still a further object of the present invention is to provide an apparatus and method for making a container lid having a partible port section for receiving a drinking instrument, such as a straw, when in use, yet which maintains the integrity of the lid against fluid transfer before being parted from the lid panel.

Another object of the present invention is to provide an apparatus and method for making a container lid having a partible port section which receives a drinking instrument and forms a seal around the drinking instrument which prevents fluid from escaping the container.

Yet another object of the present invention is to provide manufacturing apparatus and processing methodology which can be implemented to form a partible port section without requiring extensive modification to existing production machinery.

It is still another object of the present invention to provide production apparatus and process which reduces production steps by forming a partible port section contemporaneously with the fabrication of a production piece so as to eliminate a manufacturing step and accordingly provide a more efficient and less costly manufacturing.

According to the present invention, therefor, an apparatus is provided to thermoform a breakaway port section in the mold piece in the manner that the breakaway port section maintains the integrity of the piece against passage of fluids yet which is partible under mechanical pressure thereby to form a port that allows fluid transfer therethrough. In its general form, this apparatus includes an oven operative to heat the piece to a pre-selected elevated temperature so that the material forming the piece is placed in a plastic state. A mold assembly that has a mold element that provides the mold shape for the piece to be formed. The mold element has a mold surface with a female cavity that is adapted to form the resilient breakaway port section. The female cavity extends downwardly into the mold surface.

The molding apparatus also includes a pressure box assembly that has the ability to create pressure. The pressure box assembly and the mold assembly are relatively movable with respect to one another between two positions. One position is the mold open position. When in the open position, a sheet of thermoformable plastic is advanced through the heating area into the molding apparatus. The second position is the mold closed position wherein the mold and pressure box assemblies form the mold chamber. The mold chamber is subjected to pressure which in turn causes the sheet to take the shape of the mold element. This in turn forms the resilient breakaway port section in the configuration of female features.

In its preferred form, the apparatus according to this present invention simultaneously acts to mold a production piece out of a material blank and is especially adapted for forming beverage container lids with a resilient breakaway straw port.

Preferably, the female cavity in the mold surface is conical in shape, and can be truncated, so that a conical molding surface is provided. A plurality of grooves are formed in the cavity surface and may vary in depth from a maximum at the vertex to a minimum at the mold surface. The grooves may also vary in width along their length. When the port section is formed, channel structures of reduced thickness are produced and the port section is in the shape of a conical shell. The channel structures converge at the apex of the conical shell and a membrane may extend across the apex.

The method of thermoforming a sheet of material according to the present invention, therefore, includes the steps of heating the material into a plastic state and then positioning the material between a mold assembly on side thereof and a pressure box assembly on another side thereof wherein the mold element has inset female features configured in the shape of the breakaway port section and wherein the female features have a depth that is greater than the thickness of the sheet of material. The material is then allowed to cool so that, thereafter, the lines of reduced thickness form breakaway lines that are partible under mechanical force exerted on the forged breakaway port section.

Preferably, the method of the present invention is used to fabricate a container lid for a beverage container and includes the step of molding a lid edge receiving structure around the breakaway port section concurrently with the step of molding the material. This method includes the step of trimming the container lid from a sheet of material after allowing the material to cool. The step of molding the port portion of material is preferably accomplished by a vacuum/pressure process.

These and other objects of the present invention will become more readily appreciated and understood from a consideration of the following detailed description of the preferred embodiment when taken together with the accompanying drawings, in which:

BRIEF DESCRIPTION OF THE DRAWINGS

FIGS. 4(a) and 4(b) are enlarged diagrammatic views of the lid trimming/slot forming apparatus according to the prior art used to cut the lids of FIG. 1 with FIG. 4(a) being in the open position and FIG. 4(b) being in the closed or cutting position;

FIGS. 6(a) and 6(b) are diagrammatic side views in elevation showing a thermoforming apparatus and a lid trimming assembly of the exemplary embodiment of the present invention incorporating the improved methodology of this invention;

FIG. 10 is a cross-sectional view taken about lines 10—10 of FIG. 2;

FIG. 11 is a cross-sectional view taken about lines 11—11 of FIG. 2;

DETAILED DESCRIPTION OF THE PREFERRED EMBODIMENT

Figure 1:
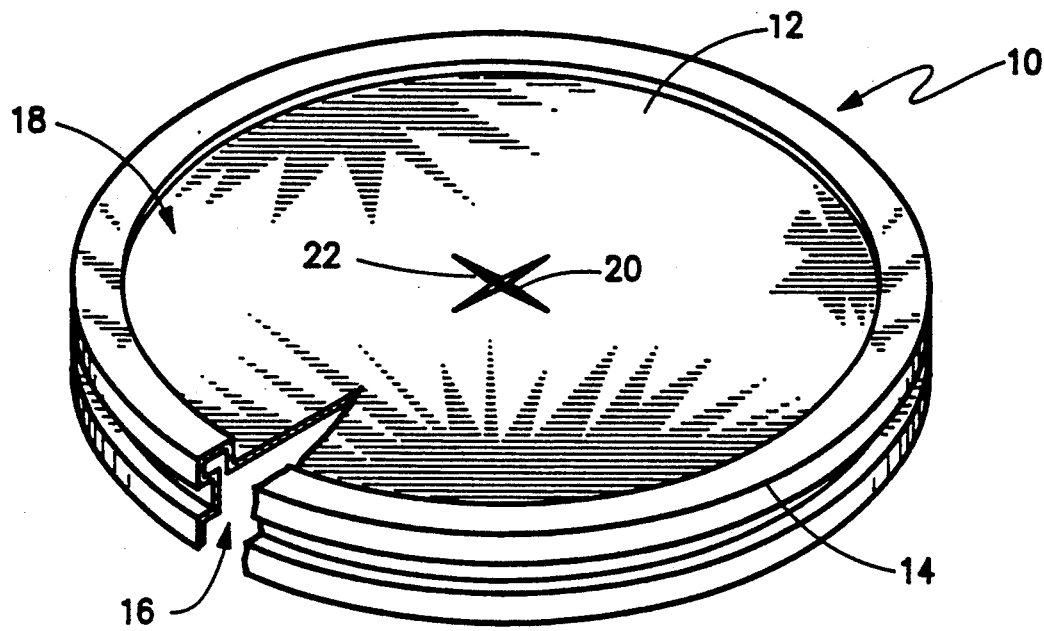
FIG. 1 is a perspective view of a container lid according to the prior art.

The present invention relates to thermoforming apparatus and methodologies which are adapted to form a resilient breakaway port section in a production piece that is constructed out of a material which becomes plastic at elevated temperatures. Thus, the concepts of this invention are incorporated into a thermoforming mold so that the breakaway port section is formed simultaneously with the formation of the mold or production piece. This reduces production costs both from an operative standpoint and from a capitol equipment standpoint. The present invention can be implemented both in the original thermoforming equipment and also as a retrofit structure for existing thermoforming machinery without the need for undue modification thereof.

While it is not the intent of this disclosure to in any way limit the type of production piece into which a breakaway port section is formed, an exemplary technology which is especially suited for use of the present apparatus and methodology is that thermoforming technology used to fabricate container lids such as used with beverage containers. Thus, this disclosure shall describe the apparatus according to the fabrication of container lids for purposes of illustration, and the present invention is accordingly directed to a container lid having the improved construction disclosed herein.

In order to best appreciate the differences between the apparatus and methodology of this invention as compared to prior art structures, it is first helpful to understand the apparatus and methodology used to fabricate existing beverage container lids. An example of such a container lid is therefore shown in FIG. 1 where it may be seen that the prior art container lid 10 has a central panel 12 which is surrounded by a peripheral lip 14 that forms an edge for lid 10. Peripheral lip 14 has an inverted U-shaped structure to provide an inverted channel 16 sized to receive the rim of a container to be covered by lid 10, such as a beverage drinking container. An access port 18 is formed in central panel 12 by a pair of intersecting slits 20 and 22 which form a plurality of triangular tabs which are severed from one another so that a straw may be inserted through access port 18. This structure is well known, but it should be understood that, in the prior art, slits 20 and 22 completely sever the thickness of the panel 12 so that the sealing integrity of the panel is violated, that is, fluids may leak out of port 18 even when lid 10 is mounted on the container.

Figure 3A:
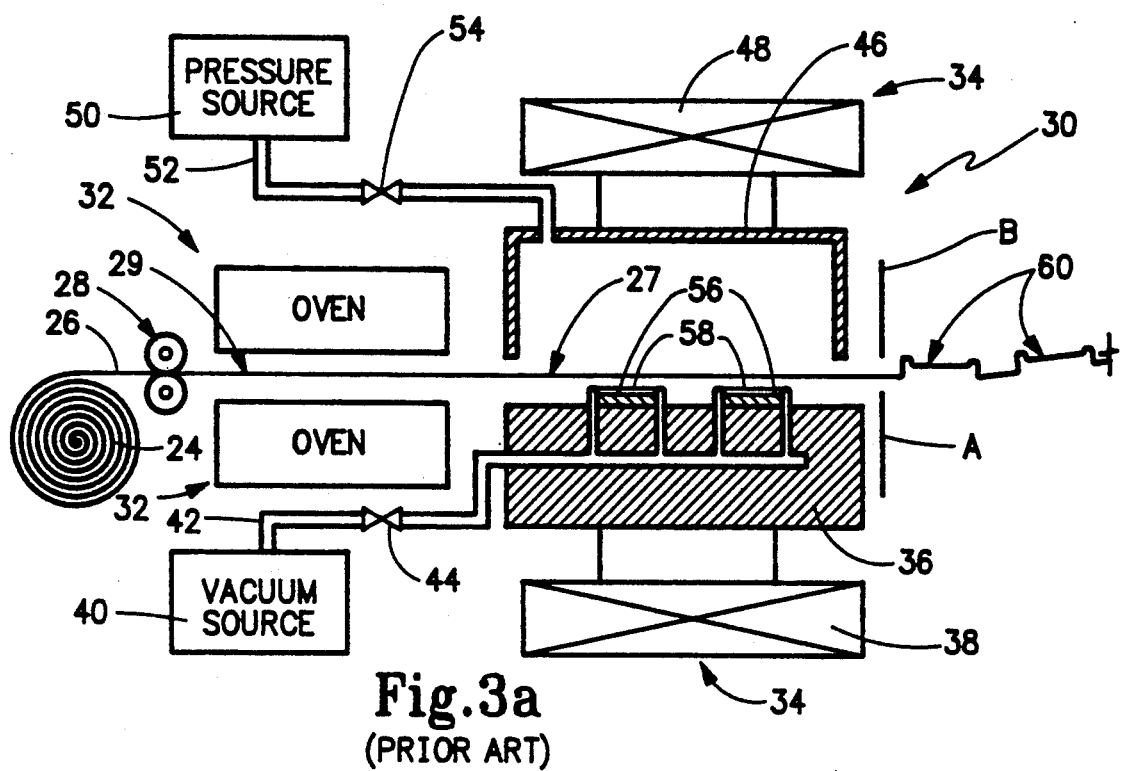
FIGS. 3(a) and 3(b) are diagrammatic side views in elevation respectively showing the prior art thermoforming assembly and lid trimming/slot forming apparatus for fabricating production pieces in the form of beverage container lids such as shown in FIG. 1.

The fabrication apparatus for the prior art lid shown in FIG. 1 is best shown in FIGS. 3(a), 3(b), 4(a) and 4(b). In FIG. 3(a), it may be seen that a stock of material may be provided by roll stock 24 which allows advancement of continuous sheet 26 of material through a thermoforming assembly 30. This advancement may be accomplished, for example, by means of counteracting roller assembly 28. The material forming sheet 26 is a material which may be placed in a plastic state at an elevated temperature and, naturally, includes normal thermoforming plastic materials such as polystyrenes, polyethylene teraphthalate (PET) or other organic polymers. Accordingly, sheet 26 is first advanced through an oven assembly 32 to heat the material to an elevated temperature after which it moves into a thermoforming apparatus 34.

Thermoforming mold 34 includes a mold assembly 36 mounted on suitable supports 38 and connected to a vacuum source 40 by means of a conduit 42 and a valve 44. Opposite mold assembly 36 is a pressure box assembly 46 mounted by suitable supports 48 and connected to a pressure source 50 by means of a conduit 52 and valve 54. Mold assembly 36 includes one or more mold elements, such as mold elements 56, each of which having an upstanding rib structure 58 operative to form peripheral lip 14 as a matrix in sheet 26 as shown by formed production pieces 60. To this end, mold assembly 36 and pressure box assembly 46 are relatively movable with respect to one another in the direction of arrows A and B, respectively to form a pressure box chamber in a closed state. When closed, pressure is applied to side 27 of sheet 26 by opening valve 54 while suction or vacuum is applied to side 29 of sheet 26 by opening a valve 44. Thus, sheet 26 is forced, by the pressure differential, to take the configuration of mold elements 56.

Figure 3B:
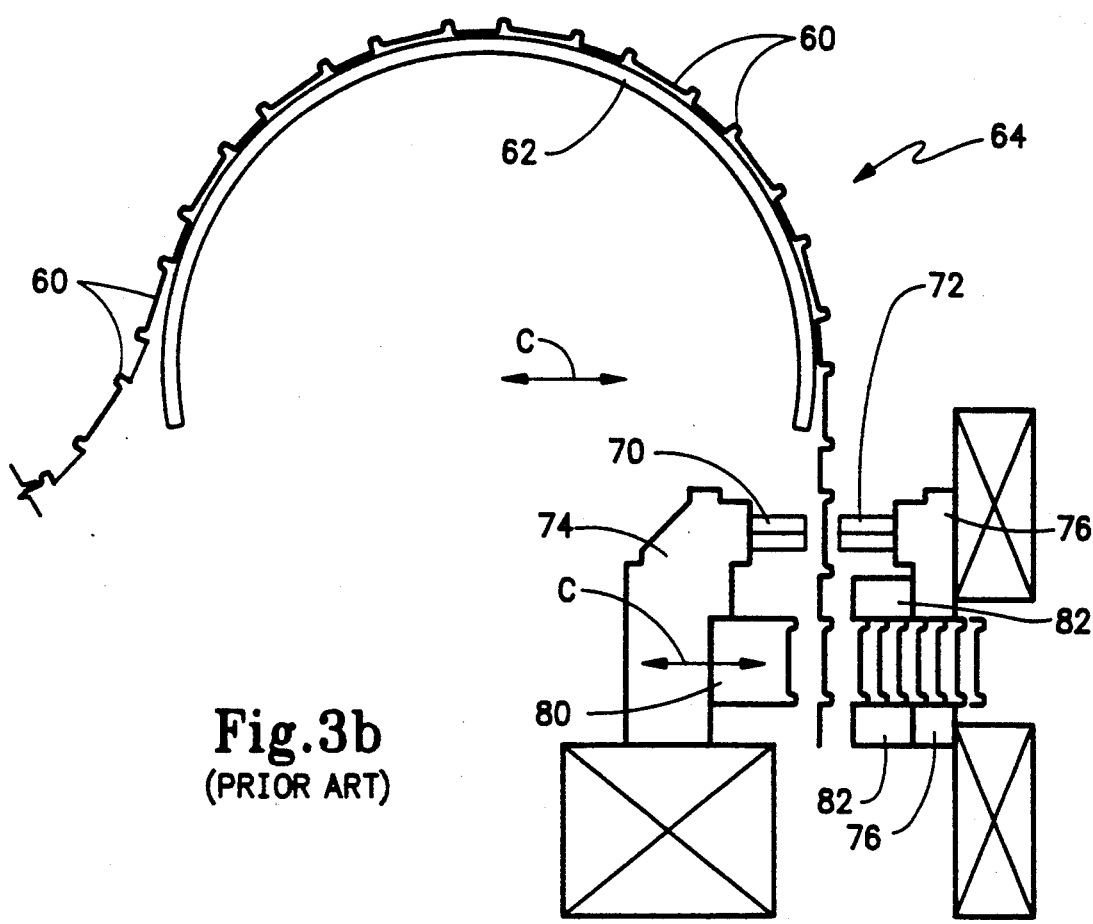

After pieces 60 are molded, they are advanced over a guide hood 62 and into a lid trimming/slot cutting assembly 64 best shown in FIGS. 3(b), 4(a) and 4(b). Cutter assembly 64 includes a pre-punch assembly including first and second punch elements 70 and 72 mounted by suitable supports 74 and 76, respectively and a cutter assembly including first and second knife elements 80 and 82 which are mounted, respectively, to supports 74 and 76. Supports 74 and 76 are relatively movable toward and away from one another, as shown by arrow C between an open position shown in FIG. 4(a) and a closed position shown in FIG. 4(b). When punch elements 70 and 72 close, punch surfaces 71 and 73 act to cut slits 20 and 22 in lid 61. Simultaneously, an adjacent lid 63 containing a slitted port section 18 is cut from the sheet of material by means of knives 80, 82. To this end, it may be seen that knife 80 is provided with a lid edge profile so as not to damage the lid edge structure when the cutting operation is performed. Completed lids 90 each containing a port 18 are then ejected from the apparatus.

Figure 5:
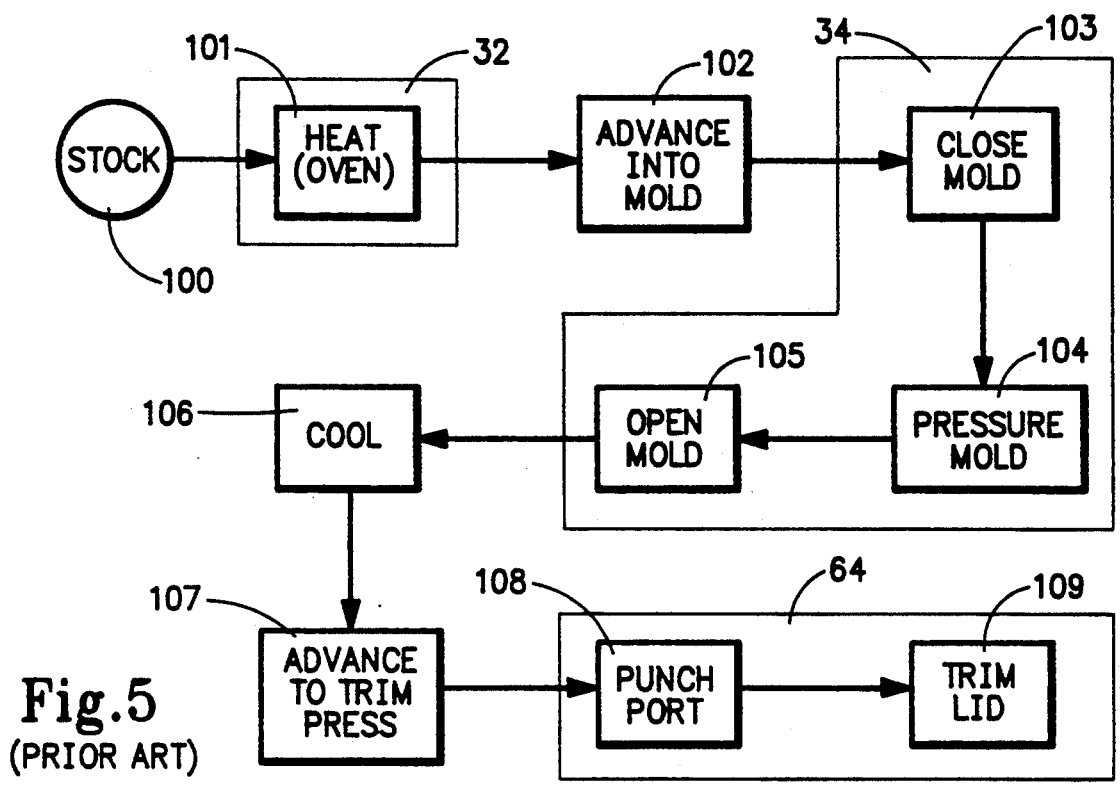
FIG. 5 is a block diagram showing the fabricating methodology according to the prior art assemblies shown in FIGS. 3(a), 3(b), 4(a) and 4(b) to fabricate prior art production piece lids according to FIG. 1.

The method according to the prior art apparatus, then, is diagrammed in FIG. 5. Here, it may be seen that a sheet of material is advanced from stock location 100, which may be, for example, a roll of material 24, into a heating step at 101. From there, the material is advanced, at 102, into a mold after which the mold closes at 103, is pressurized at 104 to mold a production piece, and the mold is opened at 105. After the mold is open, the piece is cooled at 106, and advanced to a trim press at 107. In the trim press, the port is punched at 108 and a resulting production piece or lid is trimmed at 109. It should be understood that the heating step 101 may be accomplished by oven 32 as is shown by the dotted line surrounding step 101. Similarly, thermoforming apparatus 34, shown as a dotted line in FIG. 5, accomplishes the steps of closing the mold pressurizing and opening the mold shown as steps 103-105. The punching of the port at 108 and the trimming of the lid at 109 is accomplished by lid trimming/slot forming assembly 64.

Figure 2:
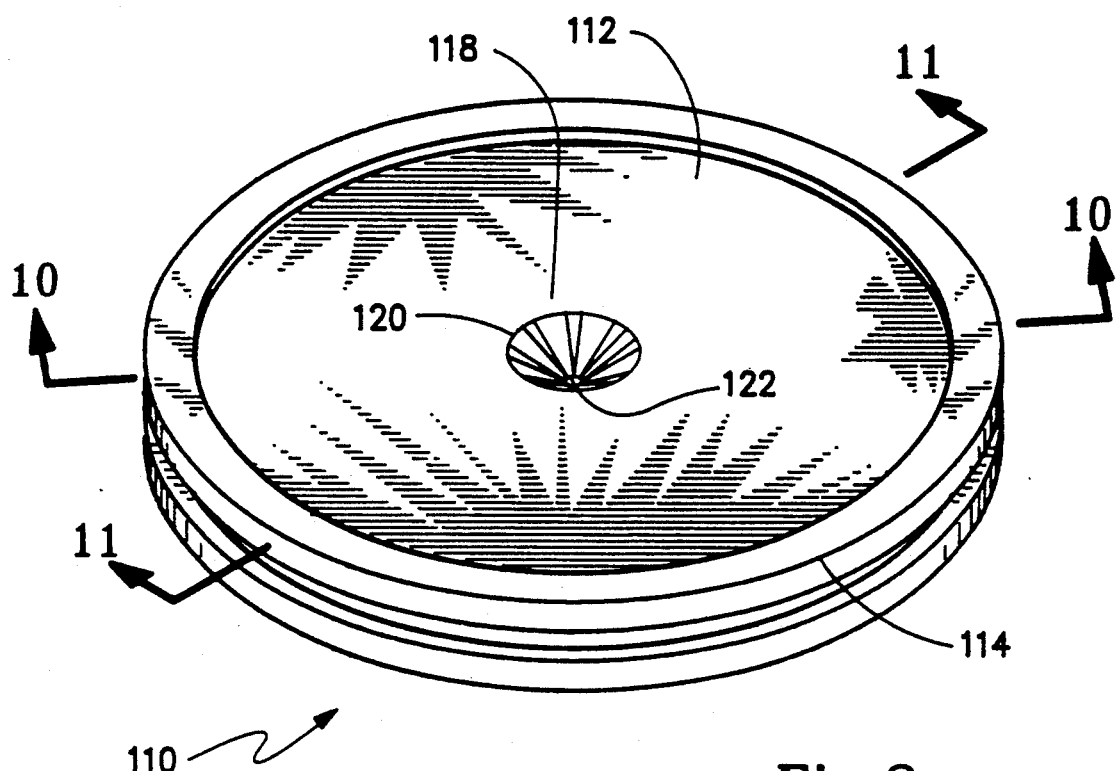
FIG. 2 is a perspective view similar to FIG. 1 but showing a container lid according to the apparatus and method of the present invention as a representative production piece.

Turning again to FIG. 2, it may be seen that the improved lid 110 according to the present invention is similar to lid 10 by having a central panel 112 surrounded by a peripheral lip 114 which is the same as lip 14. However, instead of utilizing slits completely through panel 112 to form a breakaway port section 18, the present invention uses a pressurized vacuum molding process to provide a breakaway port section 118 formed of generally conic configuration having triangularly shaped channel structures as shown in FIG. 2. It should be understood that these triangularly shaped channel structures are formed of reduced thickness but are preferably not cut completely through panel surface 112. In any event, breakaway port section 118 maintains integrity against the passage of fluids until it is parted by a mechanical pressure such as breaking port 118 by a straw, some other implement, or the fingers.

Figure 6B:
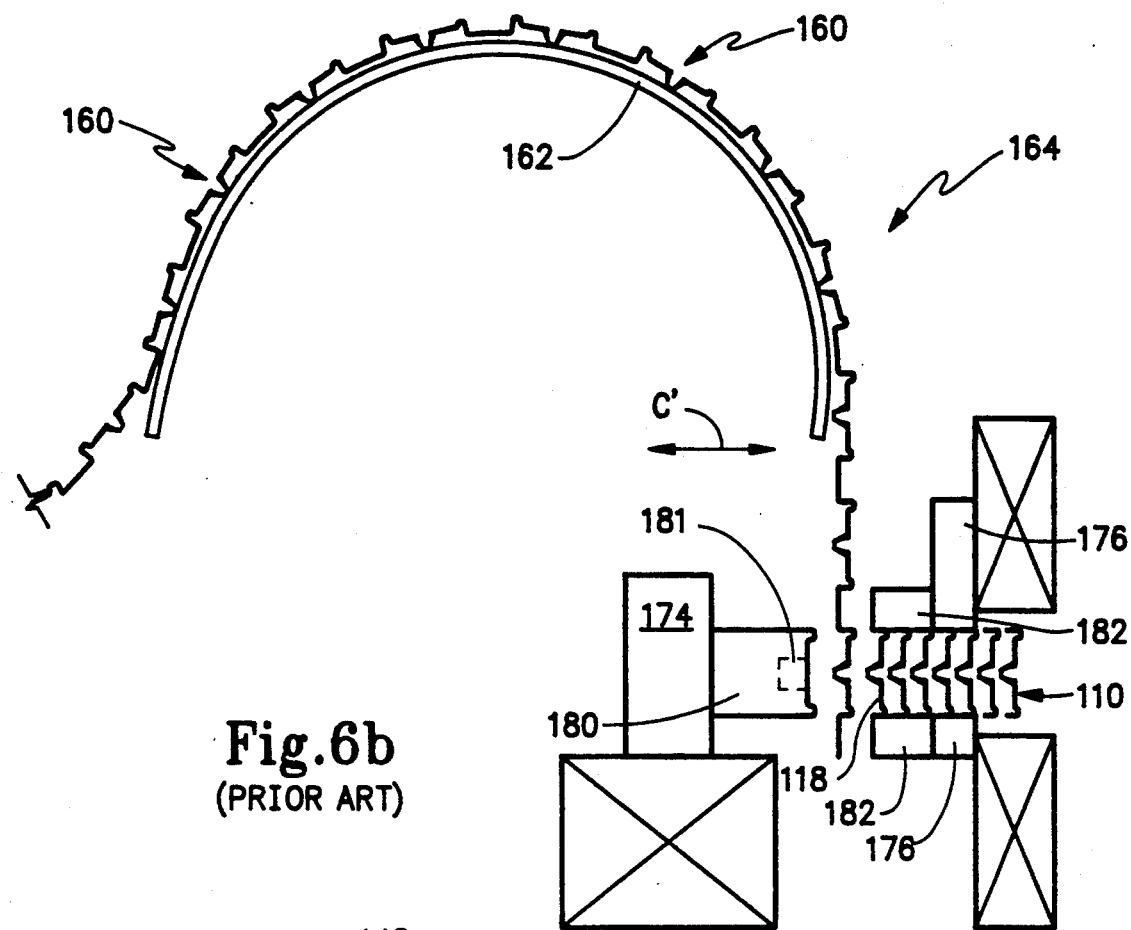

The apparatus to construct this improved lid 110 is generally shown in FIG. 6(a) and 6(b) where it may be seen that the material to be fabricated is provided in the form of stock roll 124 off of which a sheet 126 is advanced by means of rollers 128 and into a thermoforming apparatus 130. Sheet 126 first passes through an oven 132 where it is heated to a plastic state and then advanced into a thermoforming mold 134. Thermoforming mold 134 has a mold assembly 136 mounted on a support 138 and a pressure box assembly 146 mounted on support 148.

Sheet 126 has an upper side 127 facing pressure box 146 and a lower side 129 facing mold 136. Mold 136 is provided with one or more mold elements 155 described more thoroughly below with reference to FIGS. 7-9. It should be appreciated that in an alternative embodiment the mold element 155 could have a complimentary striker element provided in the pressure box as within the size and design constraints of the thermoforming apparatus. In any event, pressure box assembly 146 is connected by a conduit 152 to a pressure source 150 through a valve 154. Likewise, mold assembly 136 is connected to a vacuum source 140 by means of a conduit 142 and a valve 144.

Thermoforming apparatus 130 operates to form a web of production pieces 160, each including a breakaway port section 118, in sheet 126. This sheet is advanced, as is shown in FIG. 6(b), over a hood 162 so that the formed production pieces 160 become cooled and cut into lids 110. Accordingly, as production pieces 160 are advanced into a trim assembly 164 which includes a first blade section 180 mounted by a support 174 and second blade 182 mounted by support 176. Blades 180 and 182 are relatively movable with respect to one another in the direction of the arrow C' so that blade 180 moves into a cavity formed by blades 182 to sever each individual lid 110 from the sheet of material. Again, blades 180 and 182 have profiles that match each peripheral lip 114 of lid 160 so as to avoid destroying the integrity thereof. Furthermore, blade 180 has an opening 181, shown in phantom, to protect breakaway port section 118 during the cutting procedure. It should be noted at this point that the pre-punch assembly described with respect to FIG. 3(b) is entirely eliminated from the improved apparatus since the breakaway port section is formed during the molding process occurring in the thermoforming apparatus 130. Further, it should be understood that the trimming assembly 164, as is existing punch/cutting assembly 64, is an existing structure as is known to the ordinarily skilled person in this field of invention.

Figure 7A:
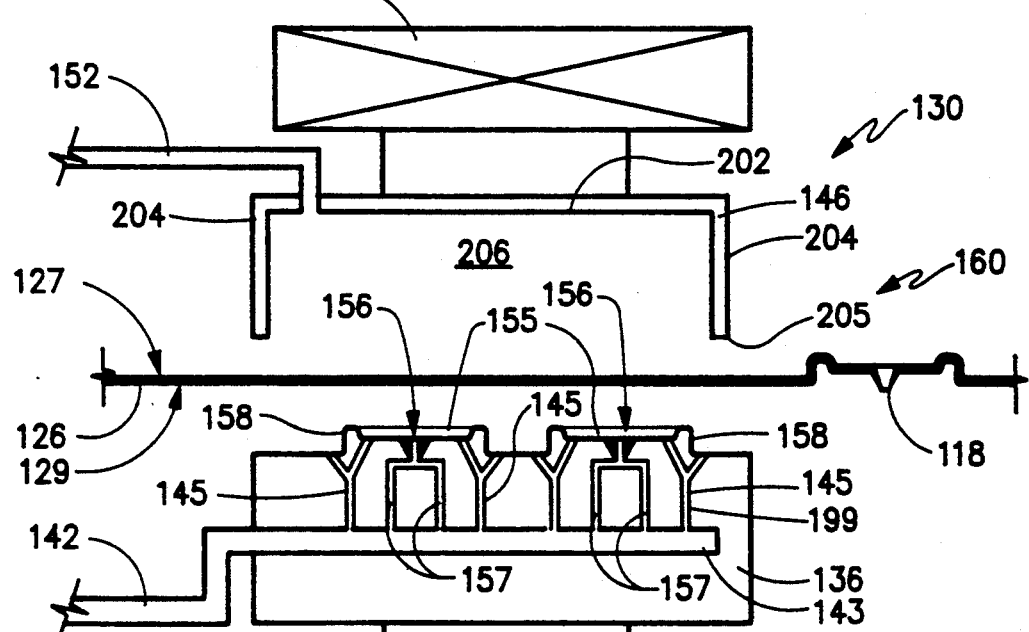
FIGS. 7(a) and 7(b) are enlarged diagrammatic side views in elevation showing the thermoforming mold according to the exemplary embodiment of the present invention with FIG. 7(a) being in a mold open position and FIG. 7(b) being in a mold closed position.
Figure 7B:
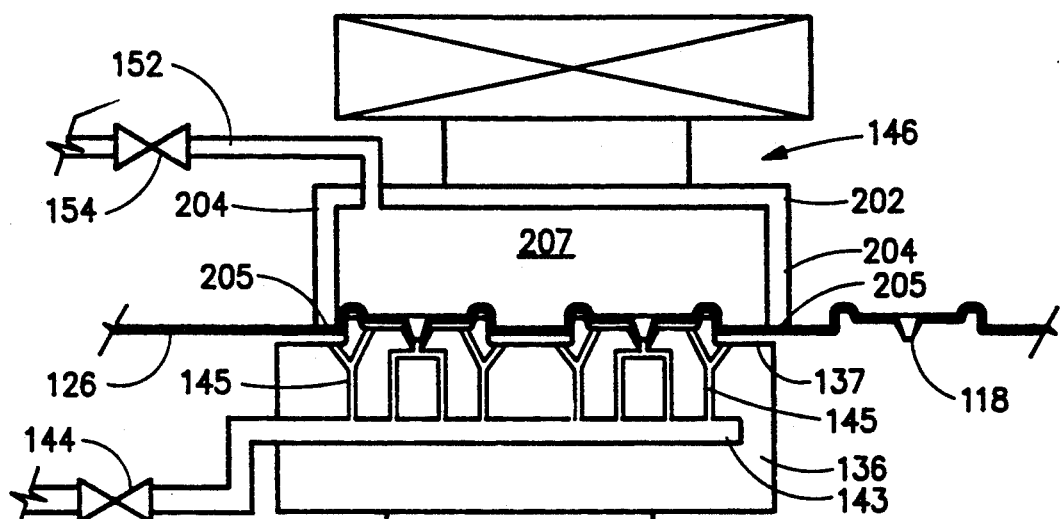

As is shown with greater particularity in FIGS. 7(a) and 7(b), a plurality of production pieces 160 are molded out of sheet 126 during each cycle of thermoforming apparatus 130. As noted above, thermoforming apparatus 130 includes a pressure box assembly 146 mounted by supports 148 and connected to a pressure source 150 by means of a conduit 152 and valve 154, and thermoforming apparatus 130 also includes a mold assembly 136 mounted on suitable supports 138 and connected to vacuum source 140 by means of a conduit 142 and a valve 144. The mold assembly 136 and the pressure box assembly 146 are relatively movable with respect to one another between the mold open position shown in FIG. 7(a), and the mold closed position shown in FIG. 7(b), which creates a mold chamber 207.

Mold assembly 136 has a pair of mold elements 155 including upstanding circumferential male rib 158 which is of the shape of the production piece to be formed. The elements 155 each include a female cavity 156 having a general cone-shape configuration. This female cavity 156 is inset within the perimeter of each rib 158 and, in this embodiment, is centrally located therein. Vacuum conduit 142 is in fluid communication with vacuum manifold 143 which in turn has a plurality of passageways 145 which communicate through the surface of mold assembly 136. Manifold 143 is also connected to passageways 157 which communicate with female cavity 156 of the respective mold element 155. It should be understood that the significant difference between mold assembly 136 and mold assembly 36 is the inclusion of mold elements 155 with their female cavities 156.

Pressure box assembly 146 includes a base plate 202 and a surrounding sidewall 204 to define a cavity 206 therein. Cavity 206 is in fluid communication with pressure conduit 152. In the preferred embodiment of the present invention, the portable port is formed by a molding process and a forging process is not necessary, but, as noted above, punch elements and striker assemblies may be provided, if desired, in this thermoforming apparatus. Also noted above, the mold assembly 136 and the pressure box assembly 146 are relatively movable with respect to one another in the open and closed position as is shown in FIGS. 7(a) and 7(b), respectively. The mold chamber 207 is formed when the mold assembly 136 and the pressure box 146 are in the closed position. In the closed position, pressure is applied to side 127 of sheet 126 by opening valve 154 while suction or vacuum is applied to side 129 of sheet 126 by opening valve 144. Thus, sheet 126 is forced, by the pressure differential to take the configuration of mold elements 155 including female cavity 156 which is connected to the vacuum source 144 by passageway 157.

Operation of the present apparatus in the mold closed position is best shown in FIG. 7(b). Here, it may be seen that, in the mold closed position, pressure box lower edge 205 of sidewall 204 of pressure box assembly 146 advances towards upper surface 137 of mold assembly 136 so that cavity 206 and mold element 136 form a pressure chamber 207 by establishing a relative seal against each other with sheet 126 trapped therebetween. Valves 154 and 144 are opened when the thermoforming mold is in the mold closed position so that chamber 207 is pressurized on a side of sheet 126 that faces pressure box 146 and a reduced pressure is applied through manifold 143 and passageways 145 and 157 on the side of sheet 126 facing mold 136. This differential in pressure causes sheet 126 to be configured into the surrounding lip structures 114 as a result of ribs 158 and causes the partible ports 118 to be configured as a result of the female cavities 155.

Figure 8:
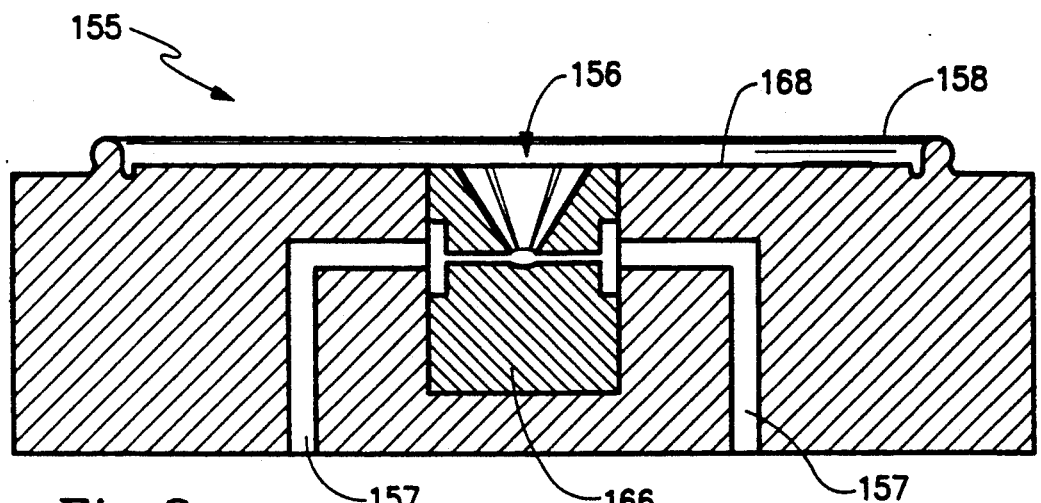
FIG. 8 is a side view in cross-section of an exemplary embodiment of a mold element used in the thermoforming mold shown in FIGS. 7(a) and 7(b)
Figure 9:
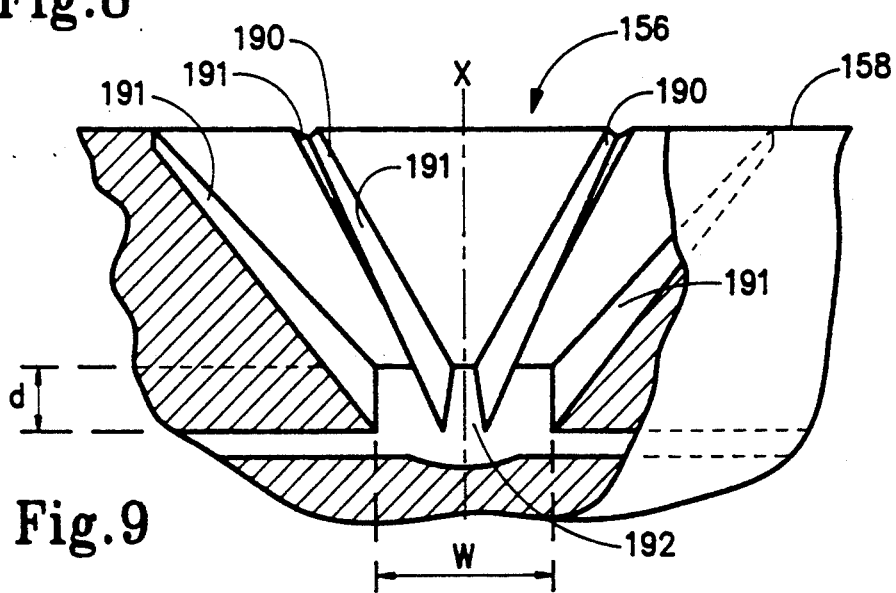
FIG. 9 is an enlarged side view in partial cross-section of the female cavity portion of the mold element shown in FIG. 8.
Figure 12:
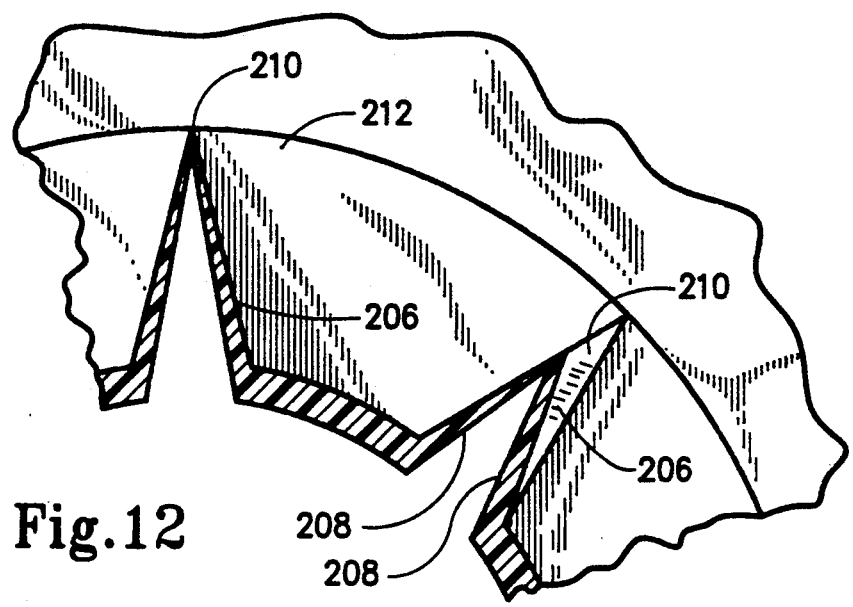
FIG. 12 is an enlarged view, in partial cross-section, taken about liens 12—12 of FIG. 11.

A representative mold element 155 is shown in FIG. 8, and enlarged cross-section of female cavity 156 thereof is shown in FIG. 9. In these figures, female cavity 156 is of the type constructed to mold a partible port 118 which has six sections, although it should be understood that it is entirely within the scope of this invention that partible port having a different number of sections could be formed without departing from the teachings described herein. As is shown, then, in FIG. 8, mold element 155 has circumferential rib 158 encircling female cavity 155 which is conic in shape. Female cavity 156 is shown in fluid communication with passageways 157, and it should be understood that mold element 155 may be an inset, such as inset 166, into mold assembly 136 so that different mold elements 155 may be exchanged. Alternately, mold element 155 may be integrally formed on the surface of mold assembly 136.

With reference to FIG. 9, it may now be seen that female cavity 156 has a cone shaped surface 159, and a plurality of triangularly shaped grooves 190 formed in conic surface 159. Grooves 190 extend from vertex opening 192 in equiangularly spaced relation to one another around a central axis "X". Accordingly, it may be seen that each of grooves 190 are in fluid communication with a connecting passageway 157, each of which connects with passageway 157. Each groove 190 has sidewalls 191 and varies in depth from a maximum depth "d" at vertex 192 to negligible depth at surface 168 of mold element 155. In the preferred embodiment of the present invention, the depth "d" is selected to be greater than the thickness of sheet 126 to be molded. That is, the groove depth at its maximum, is substantially greater than the thickness of the sheet into which breakaway port 118 is to be fabricated. Where the thickness of sheet 126 is approximately 0.010", the depth "d" of each groove 190 is selected to be 0.080". The diameter of vertex opening 192 is selected to be no more than about double the depth of each groove 190 so that, in the exemplary embodiment of the present invention, vertex opening 192 is selected to be approximately 0.125" to 0.160". The width of each groove may either be constant over its length or diminish slightly from vertex opening 192 to surface 168. Preferably, this width of grooves 190 is 0.060" but it should not be less than 0.030" when forming port 118 out of sheet stock having a thickness of 0.010". Finally, it may be appreciated from FIGS. 8 and 9 that six grooves 190 are formed in conic surface 159, but it is within the scope of this invention to form a different number of grooves in this conic surface. It is preferred that at least three such grooves 190 be included in the structure of female cavity 156.

A finished lid 110 is best shown in FIGS. 2 and 10–12. Here it may be seen that lid 110 has a central panel 112 surrounded by a lip 114 adapted to engage a container, such as a beverage cup, glass, etc. Breakaway port 118 is in the form of a conic shell 200 which has a base opening 202 through which a drinking instrument, such as a straw, is to be inserted. Conic shell 200 terminates at an apex 204 corresponding to vertex opening 192 of female cavity 156. A plurality of channel structures 206 extend equiangularly around axes "X"' with channel structures 206 being formed by grooves 190 during the molding operation. Accordingly, it should be appreciated that channel structures 206 have a depth "d" at apex 204 since this is the depth of each groove 190 at vertex opening 192. Furthermore, the depth of each channel structure 206 diminishes from apex 204 to base opening 202 correspondingly to the reduction depth of each groove 190, as described above.

Each channel structure 206 accordingly has a pair of sidewalls 208 which are joined along spine 210. An arcuate triangular panel portion 212 extends between each channel structure 206, and during normal forming, a thin membrane 214 extend across apex 204. With reference to FIGS. 9–12 and the special reference to FIG. 12, it may be seen that female cavity 156 of mold element 155, and the molding method according to the present invention, advantageously employs fundamental properties of thermoformable plastics. Most heated thermoformable plastics begin to set, that is "freeze", as soon as it comes in contact with the mold surface. Thus, there is an increased thickness due to the thickness of the material where the thermoformable plastic material first contacts mold element 155. Thus, as the material begins to advance into female cavity 156, the plastic material begins to thin. The thinned material starts to freeze when it contacts conic surface 159, except at grooves 190. As the material advances into grooves 190, it continues to thin along the sidewalls 191 of grooves 190 until the breakaway port is formed. Furthermore, the material thins as it advances towards vertex opening 192 so that membrane 214 is formed at about 1/20th the thickness of the starting material. Where the dimensions are as set froth above and where female cavity has a maximum opening size of 0.500" and a depth of 0.250" to 0.350", membrane 214 preferably ash a thickness of 0.0005". Thus, with reference again to FIG. 12, it may be seen that panels 212 of breakaway port 118 have the greatest thickness while spines 210 have the least thickness with the exception, of course, of membrane 214. Sidewalls 208 are of intermediate thickness. Accordingly, as a straw or other instrument is advanced into port 18, panels 212 are deflected outwardly which first ruptures membrane 214 and then begins to tear channel structures 206 along spines 210 beginning at apex 204 and then toward central panel 112.

Figure 13:
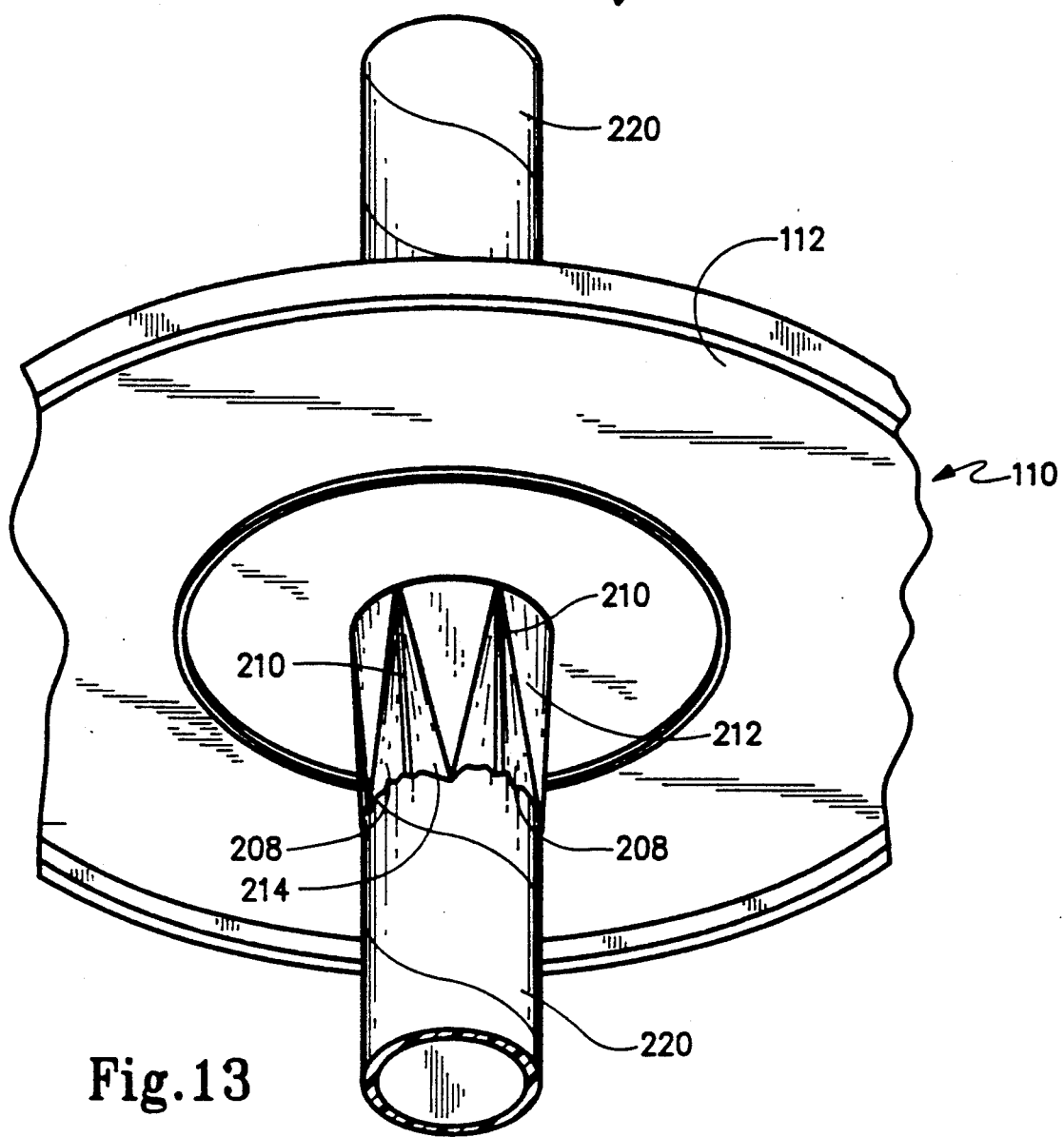
FIG. 13 is a bottom view in perspective of the lid of FIG. 2 with a straw being shown inserted therethrough.

As can be seen in FIG. 13, channel structures 206 expand accordion-like to conform to the outer perimeter of the straw 220. The opening through port 118 is ruptured just sufficiently to allow passage of straw 220 therethrough due to the resistance of tearing by spines 210. When in the expanded position, then, channel structures 206 resiliently close around the drink instrument to form a barrier to escaping fluid as a result of "memory" of the plastic material. As fluid is withdrawn from the container by the drinking instrument, the container becomes slightly pressurized further tightening the barrier formed by the panels 212 and the channel structures 206 around the outer surface of straw 220.

Figure 14:
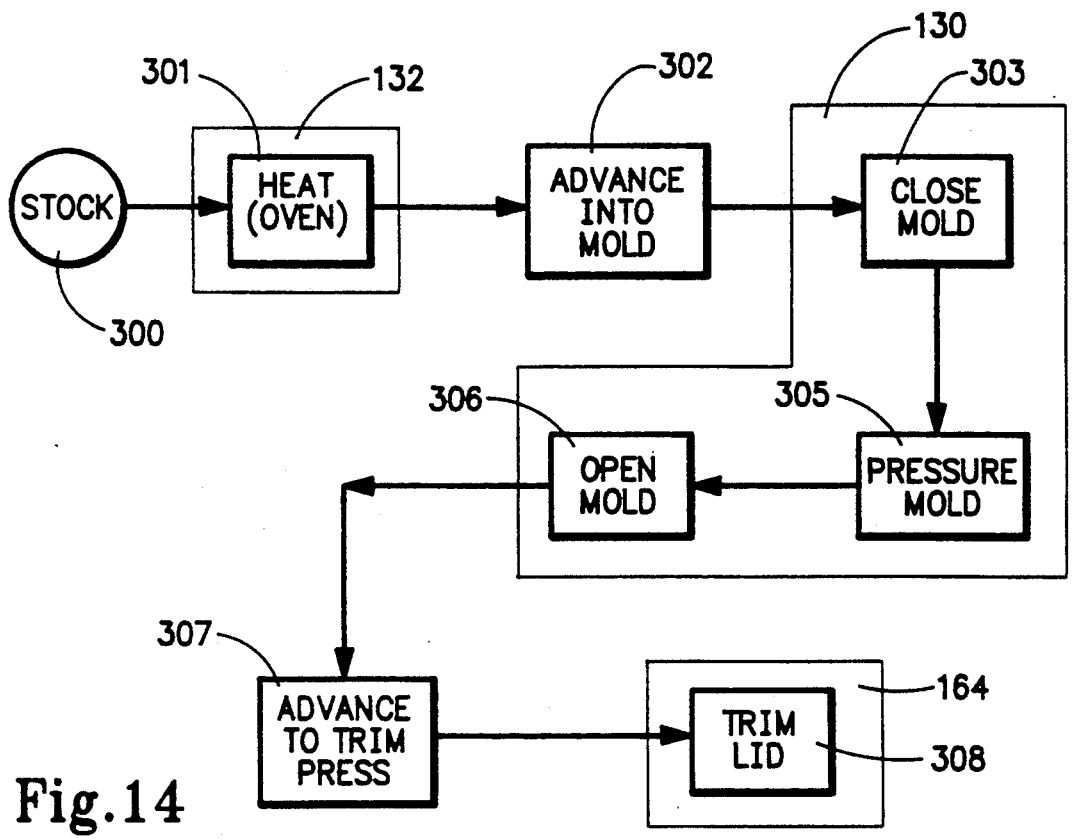
FIG. 14 is a block diagram showing the processing steps according to the broad exemplary form of the methodology of the present invention.

From the foregoing, it should be appreciated that the method according to the preferred embodiment of the present invention may be diagrammed in FIG. 14. Here again, stock is advanced from stock roll 300 into a heating step 301 which is accomplished by oven 132. Next, it is advanced, at 302, into the mold assembly of thermoforming apparatus 130 and the mold is closed at 303. As the mold closes, the breakaway port section is formed while the article of manufacture is pressure molded at step 305. The mold is then opened at 306. After the mold is opened, the article is advanced to a trim press, at 307 and the lid is trimmed at 308 by means of trimming apparatus 164.

According to the method of the present invention, then, a method of thermoforming a sheet of material into a production piece is provided wherein the production piece has a breakaway port section. This method includes the steps of heating the material to a plastic state and then positioning the material between a mold assembly wherein the mold assembly includes a mold element on a first side thereof and a pressure box assembly on the second side thereon and wherein the mold element includes a female mold element with female features configured in the shape of the breakaway port section. The method then includes the step of applying a vacuum on a first side of the material and applying a pressure on the second side of the material whereby the material is molded into the female features thereby to form portions of reduced thickness so that a port is formed which is partible by mechanical forces exerted thereon. The method then contemplates allowing the material to cool. Furthermore, the method according to the exemplary embodiment of the present invention includes the step of forming the breakaway port section in a conical configuration having a plurality of channel structures oriented therealong. The channel structures may vary in depth and width and terminate at an apex. A thin membrane may extend over the apex with both the membrane and the channel structures being partible under the force of an instrument inserted through the breakaway port section. Thus, the method according to the present invention includes all step inherent in the apparatus and structures described above.

Accordingly, the present invention has been described with some degree of particularity directed to the preferred embodiment of the present invention. It should be appreciated, though, that the present invention is defined by the following claims construed in light of the prior art so that modifications or changes may be made to the preferred embodiment of the present invention without departing from the inventive concepts contained herein.

I claim:

1. Apparatus operative to thermoform a breakaway port section in a molded piece wherein said molded piece has a first thickness, said breakaway port section maintaining the integrity of the piece against passage of fluids yet which is partible under mechanical pressure thereby to form a port for the passage of an implement therethrough and which forms a relative seal at an interface between said implement and said port section to reduce leakage of fluids at the interface when said breakaway port section is parted by said implement, comprising:

oven means for heating said piece to a preselected elevated temperature so that said piece is in a plastic state;

a mold assembly associated with said oven means, said mold assembly having a mold element providing a mold shape for the piece to be formed, said mold element including a mold surface with a female cavity formed therein, said female cavity having a cavity surface and a plurality of grooves formed in the cavity surface; and a pressure box assembly including pressuring means for creating pressure, said pressure box assembly and said mold assembly being relatively movable with respect to one another between a mold open position and a mold closed position creating a mold chamber, said pressurizing means selectively pressuring the mold chamber to cause said piece to take the shape of the mold element and to form the resilient breakaway port section in the configuration of said female cavity.

2. Apparatus according to claim 1 wherein said grooves vary in depth at said mold surface.

3. Apparatus according to claim 2 wherein each said grooves varies in width.

4. Apparatus according to claim 1 wherein said female cavity is conical in shape.

5. Apparatus according to claim 4 wherein the conical shape of said female cavity is truncated at a vertex thereof.

6. Apparatus according to claim 4 wherein said grooves are equiangularly spaced around said female cavity.

7. Apparatus according to claim 1 wherein said mold element includes lid edge forming features so that a lid piece having a first surface insert within a lid edge is formed thereby, said female mold element being inset within the boundary of said lid edge forming features with said female features thereof projecting below said lid edge forming features.

8. Apparatus operative to thermoform pieces from a material blank whereby each said piece has a breakaway port section normally maintaining the integrity of the piece against passage of fluids therethrough yet partible under mechanical pressure thereby to form a port for the passage of fluids therethrough, comprising:

oven means for heating said material blank to a preselected elevated temperature so that said material blank is in a plastic state;

a pressure molding means for forming said pieces, said molding means including a mold assembly and a pressure box assembly relatively movable with respect to one another between a mold open position and a mold closed position creating a mold chamber, said mold assembly having a mold element providing a mold shape for the piece to be formed, and including pressurizing means selectively pressurizing the mold chamber to cause said material blank to take the shape of said mold element;

said mold element having a female cavity adapted to form said breakaway port section, said female cavity having a cavity surface with a plurality of grooves formed therein; and means for advancing said material blank through said oven means and said pressure molding means thereby forming a piece with a breakaway port section having the configuration of said female cavity.

9. Apparatus according to claim 8 including trim means located proximate said pressure box assembly for cutting said piece from said material blank.

10. Apparatus according to claim 8 wherein said material blank is in the form of a relatively continuous sheet of material, said mean for advancing operative to advance said sheet in increments through said oven means and said pressure molding means whereby said pressure molding means may be periodically operated to sequentially form a plurality of pieces in said sheet, said trim means operative to consecutively cut said pieces from said sheet.

11. In a thermoforming apparatus operative to thermoform plastic pieces out of a heated plastic material blank, said apparatus including an oven assembly operative to pre-heat the material blank to a preselected temperature, a pressure molding assembly operative to form said plastic pieces and means for advancing said plastic blank through said oven assembly, said pressure molding assembly including a mold section and a pressure box section relatively movable between a mold open position and a mold closed position whereby said mold and pressure box sections define a mold chamber when in the mold closed position and including a mold element having a mold configuration of the piece to be formed, said pressure molding assembly including pressurizing means associated therewith for selectively pressurizing the mold chamber to cause said material blank to take the shape of said mold element, an improvement comprising a female mold element associated with said pressure molding assembly and operative to form a breakaway port section in said piece, said female mold element being inset in said mold surface and having a female cavity associated therewith, said female mold element being on a first side of said material blank, said pressure box assembly being located on said second side of said material blank when in the mold chamber, said pressurizing means applying pressure to force a portion of said material blank so that said piece is forced against a the female mold element on said mold surface thereby forming said port section, said female cavity having a cavity surface with a plurality of grooves formed therein.

12. The improvement according to claim 11 including means for adjusting the magnitude of the pressure.

* * * * *